April 7, 1953            A. H. BAKER            2,634,083
APPARATUS FOR CHARGING AND WEIGHING PULVERULENT
MATERIALS INTO CONTAINERS
Filed Jan. 21, 1947            3 Sheets-Sheet 2

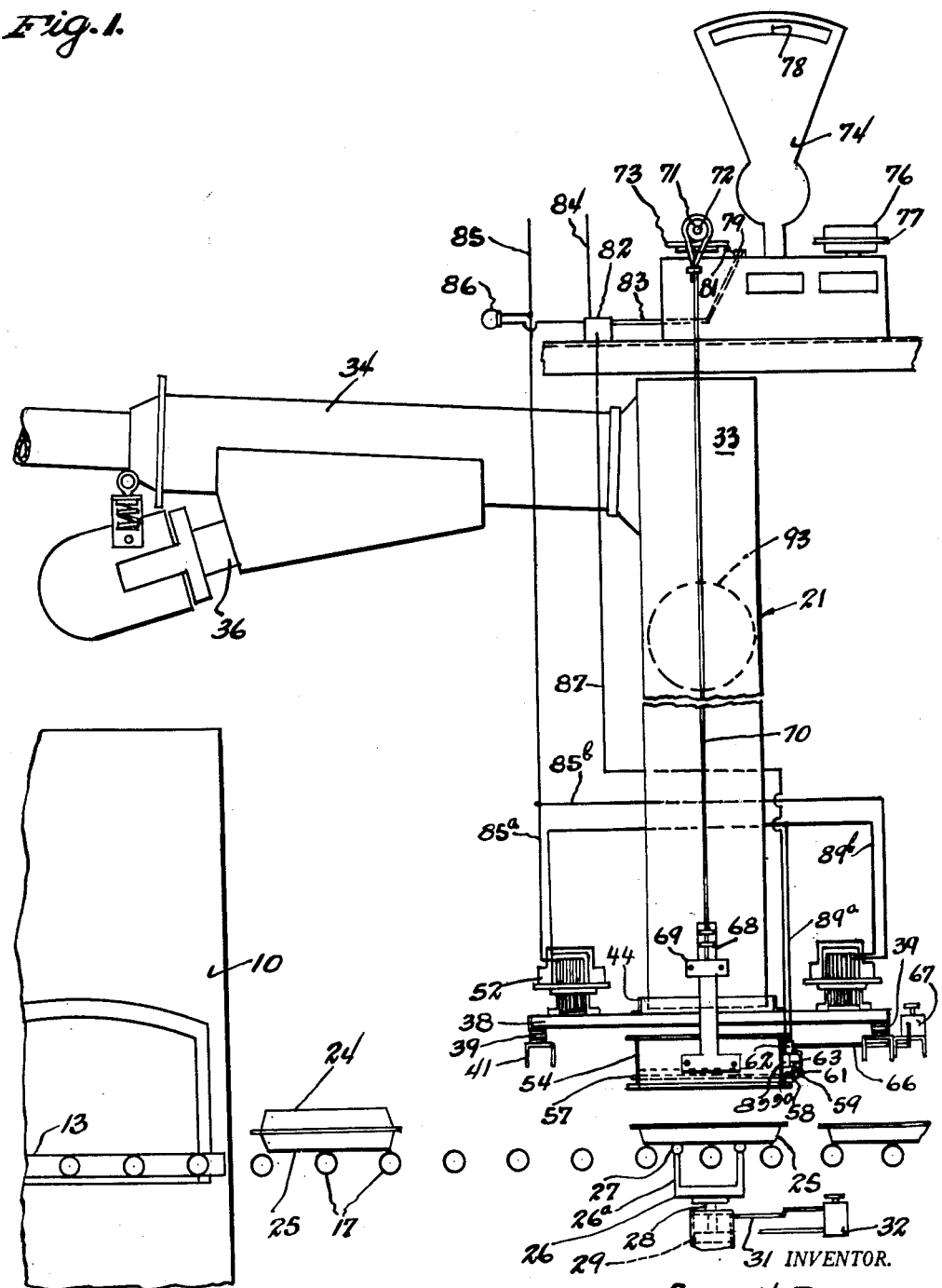

INVENTOR.
ARVID H. BAKER
BY
Olen E. Bee
ATTORNEY

April 7, 1953 A. H. BAKER 2,634,083
APPARATUS FOR CHARGING AND WEIGHING PULVERULENT
MATERIALS INTO CONTAINERS
Filed Jan. 21, 1947 3 Sheets-Sheet 3

INVENTOR.
ARVID H. BAKER
BY
Olen E. Bee
ATTORNEY.

Patented Apr. 7, 1953

2,634,083

UNITED STATES PATENT OFFICE 2,634,083

APPARATUS FOR CHARGING AND WEIGHING PULVERULENT MATERIALS INTO CONTAINERS

Arvid H. Baker, Port Allegany, Pa., assignor to Pittsburgh Corning Corporation, Allegheny County, Pa., a corporation of Pennsylvania Application January 21, 1947, Serial No. 723,370

1 Claim. (Cl. 249—53)

The present invention relates to apparatus for weighing out and charging predetermined amounts of a pulverulent material into a container and it has particular relation to apparatus for weighing out and charging finely pulverized glass admixed with a gassing agent into molds employed in the manufacture of cellular glass.

One object of the invention is to provide an apparatus which will accurately feed out and weigh a predetermined quantity of a powdery material.

A second object is to provide an apparatus which will discharge such material into a container such as a mold section for the formation of cellular glass in a relatively uniform layer over the entire bottom area of the section.

A third object of the invention is to provide an apparatus adapted to transfer the weighed quantity of powdered material to a mold with a minimum of dusting.

A fourth object of the invention is to provide an apparatus for charging powdered glass and a gassing agent to molds used to form cellular glass in a continuously operating furnace.

These and other objects of the invention will be apparent from consideration of the following specification and the appended claim.

It has heretofore been proposed to form a material of light weight and high cellularity from glass by heating finely pulverized glass and a gassing agent such as calcium carbonate, or carbon black and an oxygen giving agent such as an alkaline earth sulfate or antimony trioxide, in molds of appropriate section and size to a temperature slightly above the sintering point, but below that of complete melting and flowing of the glass. At these temperatures the particles of glass are sintered together to form a coherent mass and the gassing agent is caused to react to give off large volumes of gas which are entrapped in the sintered mass and thus provide a sintered, bloated structure involving a tremendous number of small bubbles which in most instances are sealed in such manner as to exclude permeation of moisture and gases. The bodies thus obtained are well adapted for use as a heat insulative material and possess many advantages in such capacity; among which may be included resistance to moisture and vapors, resistance to vermin, resistance to any tendency to pack down, resistance to fire, resistance to decay, resistance to chemical action and a high degree of resistance to the transmission of heat. The bodies, because of their light weight and impermeability to liquids, are also excellently adapted for use as floats in life rafts, as buoys and for such like applications. The material for several years has enjoyed extensive use.

In the commercial operation of such process the preferred method involves charging the powdered mixture of glass and gassing agent into a mold which usually is composed of upper and lower pan like sections. Each section has a form approximating that of a bread pan or a half of kitchen roaster. One mold section may be inverted over the other after the bottom section has been appropriately charged with powdered material and the resultant closed chamber passed into a furnace designed to heat the material to the desired point. Usually the furnace is tunnel-like and is provided with a conveyor such as a roller conveyor of refractory material designed to operate continuously. The molds and the conveyor rollers are of a heat resistant material such as a chrome nickel steel.

Needless to say, in the continuous operation of a large furnace or a series of such furnaces, where hundreds of molds are being charged and tons of materials are being produced each day, a great deal of labor is involved in filling the molds with precisely the right quantity of powdered material in order to obtain the desired filling of the mold when the material has become cellulated and bloated. It is also desirable that the material be relatively uniformly distributed over the bottom of the container or mold in order to assure uniform distribution and expansion of the material. Obviously hand weighing and charging of the material into molds is slow and expensive.

The present invention contemplates the provision of apparatus which will effect the weighing, charging and distribution of the pulverized material into the mold sections expeditiously and substantially automatically. As one feature, the invention contemplates the provision of a hopper which is provided with a grid or screen-like bottom adapted to be vibrated in such manner as to cause the feeding out of material in the hopper as desired. As a second feature the invention involves the provision of a bucket to receive the material as it is fed out, and being supported by scales adapted to weigh the contents of the bucket, the bucket further being provided with a louvre bottom for dumping the weighed charge into a mold in a relatively uniform layer.

For a better understanding of the invention reference may be had to the accompanying drawings in which Figure 1 is a side elevational view of an embodiment of apparatus suitable for use in the practice of the invention.

In the drawings like numerals refer to like parts throughout.

Figure 3:
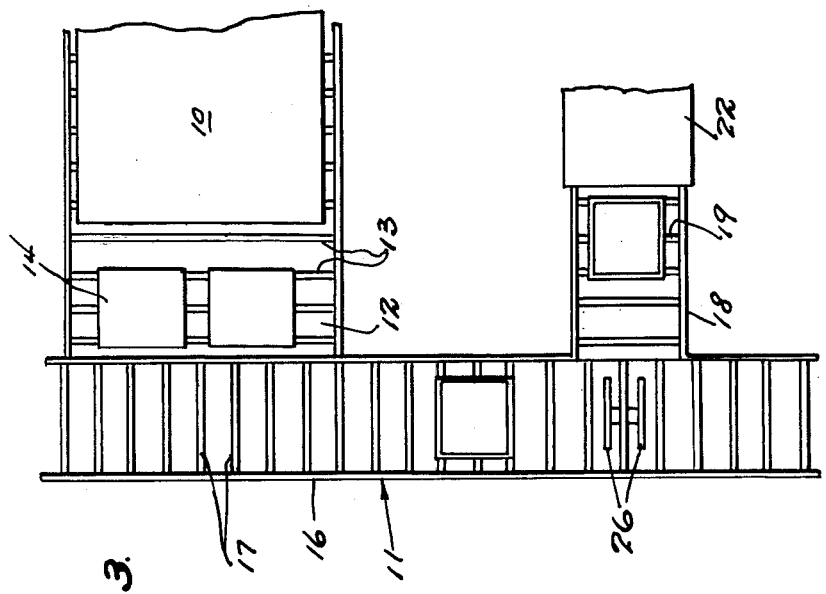
Figure 3 is a plan view of a layout of conveyors such as is employed in the practice of the invention.

In the practice of the invention an appropriate system of apparatus for forming cellular glass will comprise a furnace such as a roller hearth furnace indicated diagrammatically at 10 and a conveyor system 11 including an apron portion 12 of rollers 13 in front of the furnace 10 and providing means for supporting the molds indicated at 14 before they are pushed into the furnace for heating and cellulation. The furnace, of course, is provided with appropriate means (not shown) for slowly and continuously driving the rollers contained therein. Needless to say, it is provided with burners or other means for supplying heat. Since these features accord with existing structures, it is not believed necessary to describe them in detail, especially as they do not effect the operation of the weighing and charging mechanism which is the main feature of the invention. The conveyor system also includes a reach 16 of rollers 17 adapted to carry molds, after they have been charged, up to the apron 12. The conveyor also includes a reach 18 comprising rollers such as 19, designed to carry the molds up to the charging and weighing apparatus designated broadly as 21.

Preferably, the mold sections are coated interiorly, with an appropriate parting material such as a layer of bauxite or a clay like material designed to prevent adhesion between the glass and the mold surfaces during the bloating operation. Suitable apparatus for applying such coatings as a spray of a slurry of coating agent in water of an appropriate consistency is indicated diagrammatically at 22.

The molds to be charged as previously intimated, are of bread pan or roaster like design and include upper and lower portions 24 and 25, the edges of which are adapted to meet when the upper section is inverted over the lower section.

A lower section to be charged, conveniently is lifted from the conveyor reach 16 by means of a suitable elevator such as that shown in Fig. 1. The elevator includes a fork like member 26 having branches 26a adapted to project upwardly between the rollers 17 at an appropriate point in the conveyor system and being provided with horizontal bars 27 designed to engage the bottom of a mold section to be charged. The fork 26 is supported upon a piston rod 28 which reciprocates in a cylinder 29 having suitable connections 31 for a fluid under compressions, e. g. air, the admission and release of which is controlled by a valve such as the valve 32.

Material to be charged to the mold section 25 e. g. glass ground to an average particle size of 200 or 400 mesh or even finer and being of flour like consistency and a gassing agent such as carbon black is contained in a hopper 33 having nearly vertical sides and preferably of a transverse section approximating that of the mold sections to be charged and being of any convenient height but being sufficient to assure a column of pulverized material that will more or less cohere and feed out as desired in the manner to be described. This hopper is supplied with a mixture of finely pulverized glass and a gassing agent by means of a feed conduit 34 extending to any convenient source of supply. The material may be propelled through the conduit 34 by means such as a screw conveyor or as shown in the drawings, by simple vibration of the materials by an electrical vibrator of the type conventionally known as a "Syntron," one of which is designated at 36.

Figure 2:
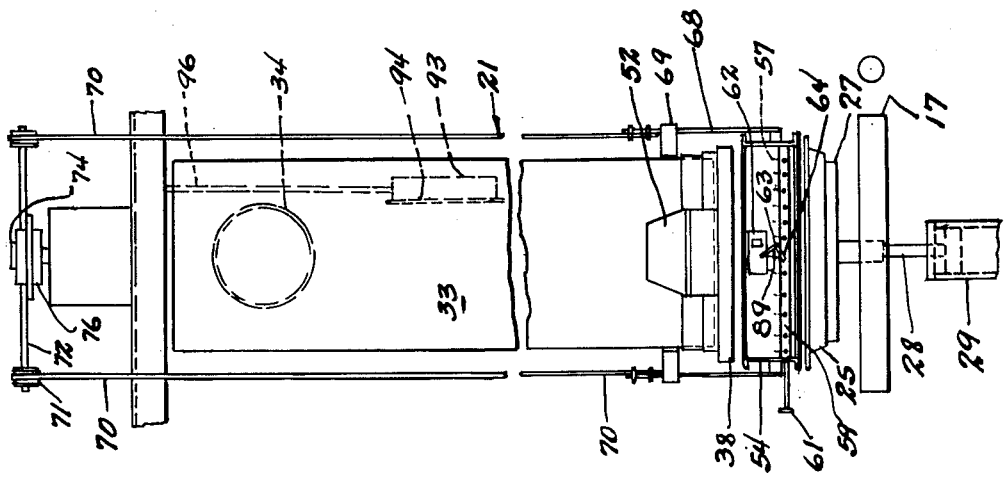
Figure 2 is a front elevational view of the apparatus shown in Figure 1.
Figure 4:
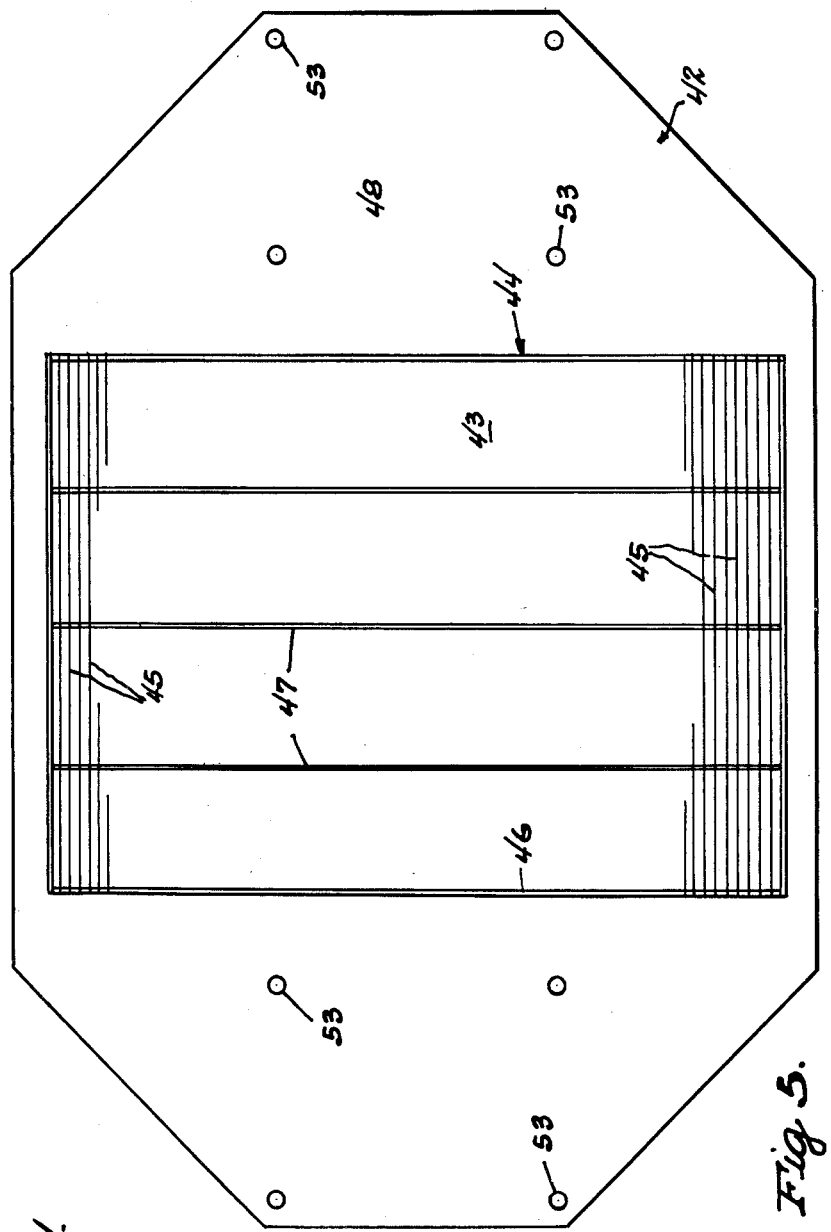
Figure 4 is a detailed plan view of a grid bottom of the hopper shown in Figures 1 and 2.
Figure 5:
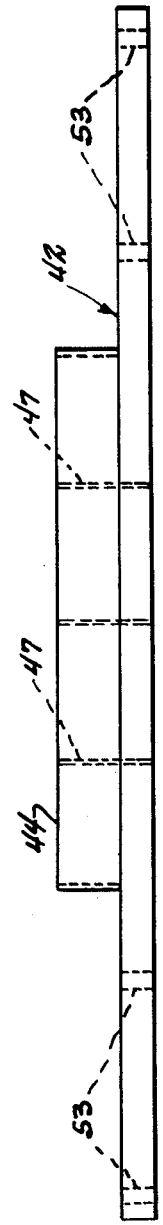
Figure 5 is an elevational view of the apparatus shown in Fig. 4.

At its lower extremity the hopper terminates slightly above a grid structure 38 termed a grizzly which as shown in Figures 1 and 2 is horizontally disposed. The latter, preferably, is not attached directly to the hopper but is suitably supported at opposite extremities upon rubber cushions or blocks 39 which in turn are supported upon any convenient support such as angle irons 41 or other frame-work. The grid includes an appropriate plate 42 having an opening 43 defined by a curbing 44 with spaced parallel bars 45 disposed at suitable intervals, for example, at intervals of approximately ⅛ to ¼ of an inch or at such other spacing as will retain the material in the hopper above, when the plate is still. The extremities of the bars 45 may be conveniently secured in slots in the curb or frame 44 about the opening 43 and they may also be secured together at appropriate intervals along their lengths by means of a series of transverse bars 47 which conveniently are slotted to provide comb like tongues or teeth adapted to fit between the bars 45. Since as shown in Figure 1 the lower extremity of the hopper is within the curb 44 defining the grizzly opening, it will be evident that the foraminous portion of the grizzly or screen is larger than the horizontal section of the hopper.

The plate 42 has projecting portions 48 at the extremities with holes 53 to receive mounting bolts for vibrators such as electrical vibrators 52 of the so-called "Syntron" type. It is a characteristic of the apparatus shown that when the hopper is filled with a pulverulent material such as finely powdered glass and the vibrators 52 are in operation, the powdered material will feed downwardly substantially continuously throughout the entire area of the opening 43.

For purposes of weighing the material and then transferring it as a relatively uniform layer to a mold section upon the bars 27, a suitable weighing bucket 54 is provided directly below the hopper. The bucket is of a section designed approximately to correspond to the area of the mold sections to be charged. The bottom thereof comprises a series of louvre bars 57, resembling those of a conventional Venetian blind, which are pivoted at their extremities in the walls of the bucket. At one extremity, they are provided with small cranks 58 interconnected by a bar 59 having a handle 61 at one extremity by means of which the louvre bars may be operated manually to discharge the contents of the bucket after a predetermined amount of material has been received therein. The louvre bars may also be operated mechanically by means of a suitable motor such as a paddle motor 62 of the type employed to operate a windshield wiper. It has an arm 63 secured to a link 64 which in turn is pivoted at one extremity to the bar 59. The motor is provided with flexible conduits 66 for actuating fluid which conduits are provided with a valve 67 by means of which the admission of fluid to the motor is controlled. By operation of the valve the contents of the weighing bucket may be discharged through the louvres into a mold section 25 disposed therebelow.

In order to weigh the contents of the bucket and thus to determine when a sufficient amount of pulverulent material is contained therein, the bucket is provided with upwardly extending brackets 68 operating in guides 69 upon the sides of hopper 33. The brackets in turn are adjustably connected at their upper extremities to rods 70. These rods are pivoted at their upper ends upon bearing elements 71 at the extremities of a transverse bar 72 resting upon a platform 73 of scales 74. The platform 73 is suitably counterbalanced by means of weights 76 upon a second platform 77. The weights 76 are so adjusted that when the bucket 54 is properly charged the scales will be just in balance as indicated by a pointer 78.

It will be apparent that the charging of the bucket to the proper point could be determined visually by observation of the index 78 or by observation of the dropping of the bucket 54 when the scales have been properly counterbalanced. The current could then be shut off from the vibrators 52 by manual means such as a push button or a switch in order to stop the feed of the material through the screen or grizzly. It is a characteristic of the screen that the feed of pulverized material stops instantly when the current is shut off of the electrical vibrators. However, in most instances it is preferable to provide automatic means to shut off the current when the scales have reached a suitable balance. For purposes of illustration there is shown in Fig. 1 a switch 79 having an arm 81 disposed in position to be engaged by the platform 73 when it descends. The switch 79 may be directly connected into the circuit of the vibrators 52 in order to shut off the current. However, since the amount of current to be controlled is substantial, it may be preferable to employ the switch 79 to operate a relay mechanism such as a relay 82 which is connected with the switch by means of suitable conductors 83. Current is supplied to the relay by a bus bar 84 which parallels a second bus bar 85 having branches 85a and 85b directly connected to the vibrator coils. A signal light 86 connects the relay 82 to bus bar 85 so that when the switch 79 is operated a visual signal is given to the attendant.

A line 87 from the relay is provided with a limit switch 89 that may be disposed on the side of bucket 54 with an arm 90 in the path of arm 63 of motor 62 so that when the louvre bottom of the weighing bucket is open, the circuit of the vibrators 52 is opened and the feed of batch through grizzly 38 cannot be initiated until the motor is operated to close the louvres. The feed of batch will then be initiated automatically. The switch is further connected by a line 89a to line 89b providing a connection to both vibrators 52.

Apparatus for maintaining an appropriate level of pulverized material in the hopper may also be provided. In the form of apparatus shown this includes a pressure sensitive device embodying a casing 93, the front face of which is closed by a flexible member such as a diaphragm 94 adapted to operate an electrical switch (not shown) which is connected in the circuit of the "Syntron" 36 in such manner as to start and stop the feed of the material to the hopper when the level of the material in the latter is at predetermined points. The pressure sensitive device may be supported in the hopper by means of a bracket 96 secured to any convenient support.

In the operation of the mechanism as herein shown and described a mold section appropriately coated with a parting agent in apparatus 22, is centered under the weighing bucket 54 upon the bars 27 and it is raised by operation of the valve 32 to admit air to the cylinder 29. The valve 67 is operated to activate motor 62 simultaneously to close the bottom of the weighing bucket and to activate the arm 90 of switch 89 to admit current to the vibrators 52. The material in the hopper feeds downwardly through the grid or screen construction into the weighing bucket until the scales 74 are tripped to actuate the switch 79 which in turn opens the circuit of the vibrators thus stopping the feed of material. The bucket remains down until the motor 62 is operated to open the louvre bottom and discharge its contents. It then rises to close switch 79 but the circuit of vibrators 52 stays open until the motor 62 is operated to close the bottom and to close switch 89.

The valve 32 may then be operated to discharge air cylinder 29 to return the charged mold section to the conveyor system. Subsequently, a top section is inverted over the bottom section and the closed chamber thus formed is passed to the furnace 10 for heating and cellulation of the contents.

It will be apparent that alternate mold sections passing over the conveyor reach 16 may be charged and the intermediate sections inverted. All of the sections may if preferred be passed to the weighing and charging mechanism over the reach 18, or in the alternate, the bottom section may be withdrawn over the reach 18 and the top section passed over the reach 16 from the right.

The forms of the invention herein shown and described are believed to be illustrative. It will be apparent to those skilled in the art that numerous modifications may be made therein without departure from the spirit of the invention or the scope of the appended claim.

I claim:

An apparatus for feeding and weighing out a uniform layer of a predetermined amount of a pulverulent material which comprises the combination of an open bottom hopper for storing the pulverulent material, a grid forming a bottom closure for the hopper and normally retaining the material within the hopper, said grid being supported independently of the hopper for movement relative to the hopper, said grid containing an opening, said opening in the grid having an apertured screen mounted therein, the apertures of the screen being of a size sufficient to cause the pulverulent material to normally bridge the apertures thus preventing the passage of the pulverulent material therethrough while the grid is at rest and the apertures being spaced so as to provide uniform passage of material through the grid to a flat bottom weighing bucket when the grid is vibrated, a flat bottom weighing bucket, the weighing bucket being disposed beneath the grid in alignment with the screen, means for vibrating the grid to pass the pulverulent material into the weighing bucket in a uniform layer, scale means associated with the weighing bucket and grid vibrating means to stop vibration of the grid when a predetermined amount of pulverulent material is deposited in a uniform layer in the bucket, the bottom of the bucket comprising a plurality of pivoted louvre bars opening to discharge the pulverulent material in a uniform layer to a mold and closing to form a support for the pulverulent material, and means for opening the bottom of the weighing bucket when a predetermined amount of material has been deposited in the bucket and the grid vibrating means has ceased to vibrate and for closing the louvre bars when the pulverulent material has passed from the weighing bucket into the mold.

ARVID H. BAKER.

REFERENCES CITED

The following references are of record in the file of this patent:

UNITED STATES PATENTS

| Number | Name | Date |
|---|---|---|
| 431,140 | Day | July 1, 1890 |
| 565,224 | Richards | Aug. 4, 1896 |
| 675,771 | Eisenhart | June 4, 1901 |
| 1,083,959 | Voglesong | Jan. 13, 1914 |
| 1,466,835 | Jennings | Sept. 4, 1923 |
| 2,095,283 | Peale | Oct. 12, 1937 |
| 2,348,372 | Weckerly | May 9, 1944 |